(12) United States Patent
Droste et al.

(10) Patent No.: US 10,347,964 B2
(45) Date of Patent: Jul. 9, 2019

(54) ELECTRICALLY HEATABLE WINDSCREEN ANTENNA, AND METHOD FOR PRODUCING SAME

(71) Applicant: SAINT-GOBAIN GLASS FRANCE, Courbevoie (FR)

(72) Inventors: Stefan Droste, Herzogenrath (DE); Bernd Stelling, Bielefeld (DE); Guillaume Francois, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 35 days.

(21) Appl. No.: 15/525,935

(22) PCT Filed: Dec. 2, 2015

(86) PCT No.: PCT/EP2015/078342
§ 371 (c)(1),
(2) Date: May 10, 2017

(87) PCT Pub. No.: WO2016/096432
PCT Pub. Date: Jun. 23, 2016

(65) Prior Publication Data
US 2017/0317399 A1  Nov. 2, 2017

(30) Foreign Application Priority Data
Dec. 16, 2014  (EP) .................. 14198258

(51) Int. Cl.
*H01Q 1/12* (2006.01)
*H01Q 1/02* (2006.01)
(Continued)

(52) U.S. Cl.
CPC ............. *H01Q 1/1278* (2013.01); *H05B 3/12* (2013.01); *H05B 3/141* (2013.01); *H05B 3/84* (2013.01);
(Continued)

(58) Field of Classification Search
CPC .......... H01Q 1/1278; H01Q 1/12; H01Q 1/44; H01Q 1/50; H01Q 1/02; H01Q 1/3275
(Continued)

(56) References Cited

U.S. PATENT DOCUMENTS 3,459,879 A  8/1969  Gerpheide
5,363,114 A  11/1994  Shoemaker
(Continued)

FOREIGN PATENT DOCUMENTS

CN  1518782 A  8/2004
CN  1778017 A  5/2006
(Continued)

OTHER PUBLICATIONS

International Search Report for International Application No. PCT/EP2015/078342 filed on Dec. 12, 2015 in the name of Saint-Gobain Glass France. (English translation and German original) dated Aug. 3, 2016. 4 pages.

(Continued)

*Primary Examiner* — Hai V Tran
(74) *Attorney, Agent, or Firm* — Pillsbury Winthrop Shaw Pittman LLP

(57) ABSTRACT

An electrically heatable antenna pane includes a transparent pane and an electrical heating layer extending over a portion of a pane surface. The pane serves at least section-wise as a planar antenna for receiving and/or transmitting electromagnetic waves. A first busbar and a second busbar electrically connectable to a voltage source and electrically conductingly connected to the heating layer are also described.

25 Claims, 5 Drawing Sheets

(51) Int. Cl.
*H05B 3/12* (2006.01)
*H05B 3/14* (2006.01)
*H05B 3/84* (2006.01)
*H01Q 1/32* (2006.01)
*H01Q 1/44* (2006.01)

(52) U.S. Cl.
CPC .............. *H01Q 1/02* (2013.01); *H01Q 1/3275* (2013.01); *H01Q 1/44* (2013.01); *H05B 2203/008* (2013.01); *H05B 2203/011* (2013.01); *H05B 2203/013* (2013.01); *H05B 2203/017* (2013.01)

(58) Field of Classification Search
USPC .................................. 219/203; 343/704, 711
See application file for complete search history.

(56) References Cited

U.S. PATENT DOCUMENTS

| | | | |
|---|---|---|---|
| 5,670,966 | A | 9/1997 | Dishart et al. |
| 5,760,744 | A | 6/1998 | Sauer |
| 5,867,238 | A | 2/1999 | Miller et al. |
| 6,025,806 | A | 2/2000 | Deininger et al. |
| 6,118,410 | A | 9/2000 | Nagy |
| 6,285,326 | B1 | 9/2001 | Diximus et al. |
| 6,313,796 | B1 | 11/2001 | Potin et al. |
| 6,320,276 | B1 | 11/2001 | Sauer |
| 6,322,881 | B1 | 11/2001 | Boire et al. |
| 6,791,496 | B1 | 9/2004 | Killen et al. |
| 6,809,692 | B2 | 10/2004 | Baliarda et al. |
| 7,388,548 | B2 | 6/2008 | Maeuser |
| 7,545,333 | B2 | 6/2009 | Li et al. |
| 7,903,042 | B2 | 3/2011 | Urban et al. |
| 9,171,658 | B2 | 10/2015 | Reul et al. |
| 2002/0045037 | A1 | 4/2002 | Boire et al. |
| 2003/0112190 | A1 | 6/2003 | Baliarda et al. |
| 2004/0178961 | A1 | 9/2004 | Maeuser et al. |
| 2004/0200821 | A1* | 10/2004 | Voeltzel ............ B32B 17/10036 219/203 |
| 2006/0109178 | A1 | 5/2006 | Takeuchi et al. |
| 2006/0139223 | A1 | 6/2006 | Li et al. |
| 2006/0202898 | A1 | 9/2006 | Li et al. |
| 2006/0273966 | A1 | 12/2006 | Maeuser |
| 2007/0045264 | A1 | 3/2007 | Nekoda et al. |
| 2007/0216589 | A1 | 9/2007 | Li et al. |
| 2010/0141539 | A1 | 6/2010 | Thole et al. |
| 2011/0221652 | A1 | 9/2011 | Li et al. |
| 2011/0230146 | A1 | 9/2011 | Morishita et al. |
| 2011/0233182 | A1 | 9/2011 | Baranski |
| 2011/0248900 | A1* | 10/2011 | de Rochemont ........ H01Q 9/26 343/803 |
| 2011/0279335 | A1 | 11/2011 | Degen et al. |
| 2012/0162047 | A1 | 6/2012 | Mizuno et al. |
| 2013/0050983 | A1 | 2/2013 | Labrot et al. |
| 2013/0099981 | A1 | 4/2013 | Vortmeier et al. |
| 2013/0141289 | A1* | 6/2013 | Vortmeier ............ H01Q 1/1285 343/711 |
| 2014/0060921 | A1 | 3/2014 | Reul et al. |
| 2014/0176374 | A1 | 6/2014 | Lo |
| 2015/0232067 | A1 | 8/2015 | Schall |
| 2018/0037006 | A1 | 2/2018 | Droste et al. |
| 2018/0037007 | A1 | 2/2018 | Droste et al. |

FOREIGN PATENT DOCUMENTS

| | | |
|---|---|---|
| CN | 1946644 A | 4/2007 |
| CN | 101223711 A | 7/2008 |
| CN | 102246590 A | 11/2011 |
| CN | 103228438 A | 7/2013 |
| DE | 3834075 A1 | 4/1989 |
| DE | 19536131 C1 | 1/1997 |
| DE | 19605999 A1 | 8/1997 |
| DE | 19735395 A1 | 2/1998 |
| DE | 19858227 C1 | 6/2000 |
| DE | 19832228 C2 | 5/2002 |
| DE | 10106125 A1 | 8/2002 |
| DE | 20210286 U1 | 12/2002 |
| DE | 10301352 B3 | 7/2004 |
| DE | 10319606 A1 | 11/2004 |
| DE | 202004001446 U1 | 3/2005 |
| DE | 10351488 A1 | 6/2005 |
| DE | 102004056866 A1 | 1/2006 |
| DE | 202004019286 U1 | 4/2006 |
| DE | 202006011919 U1 | 10/2006 |
| DE | 102008018147 A1 | 10/2009 |
| DE | 102008029986 A1 | 1/2010 |
| DE | 202008017611 U1 | 4/2010 |
| DE | 202010011837 U1 | 6/2011 |
| DE | 102012008033 A1 | 11/2012 |
| EP | 0608180 A1 | 7/1994 |
| EP | 0720249 A2 | 7/1996 |
| EP | 0847965 B1 | 10/2004 |
| EP | 1624527 A1 | 2/2006 |
| EP | 1898675 A2 | 3/2008 |
| EP | 2400591 A1 | 12/2011 |
| FR | 2913141 A3 | 8/2008 |
| JP | H06256044 A | 9/1994 |
| JP | H09502073 A | 2/1997 |
| JP | 2006522565 A | 9/2006 |
| JP | 2007251936 A | 9/2007 |
| JP | 2010-186566 A | 8/2010 |
| JP | 2013522962 A | 6/2013 |
| KR | 10-2013-0079392 A | 7/2013 |
| WO | 00/22695 A1 | 4/2000 |
| WO | 2009/015975 A1 | 2/2009 |
| WO | 2009/099427 A1 | 8/2009 |
| WO | 2010/081589 A1 | 7/2010 |
| WO | 2011/144680 A1 | 11/2011 |
| WO | 2012/052315 A1 | 4/2012 |

OTHER PUBLICATIONS

Canadian Office Action for Canadian Application No. 2,979,601 filed Sep. 13, 2017 on behalf of Saint-Gobain Glass France, dated Jul. 19, 2018. 4 pages.
Canadian Office Action for Canadian Application No. 2,979,604 filed on Sep. 13, 2017 on behalf of Saint-Gobain Glass France, dated Jul. 16, 2018 3 pages.
Chinese Office Action for Chinese Application No. 201580017710.8 filed on Dec. 2, 2015 on behalf of Saint-Gobain Glass France, dated Nov. 16, 2018. 12 pages. (Chinese Original + English Summary).
Chinese Office Action for Chinese Application No. 201680000920.0 filed on Sep. 27, 2016 on behalf of Saint-Gobain Glass France. dated Aug. 31, 2018. 22 pages. (Chinese Original + English Translation).
Chinese Office Action for Chinese Application No. 201680000923.4 filed on Sep. 27, 2016 on behalf of Saint-Gobain Glass France, dated Aug. 31, 2018. 22 pages. (Chinese Original + English Translation).
International Preliminary Report on Patentability for International Application No. PCT/EP2012/053245 filed on Feb. 27, 2012 on behalf of Saint-Gobain Glass France, dated Oct. 8, 2013. 17 pages. (English Translation + German Original).
International Preliminary Report on Patentability for International Application No. PCT/EP2016/056975 filed on Mar. 30, 2016 on behalf of Saint-Gobain Glass France, dated Oct. 10, 2017. 14 pages. (English Translation + German Original).
International Preliminary Report on Patentability for International Application No, PCT/EP2015/078342 filed on Dec. 2, 2015 on behalf of Saint-Gobain Glass France, dated Jun. 20, 2017. 12 pages. (English Translation + German Original).
International Preliminary Report on Patentability for PCT Patent Application No, PCT/EP2016/056974 filed on Mar. 30, 2016 on behalf of Saint-Gobain Glass France, dated Oct. 10, 2017. 14 pages. (English Translation + German Original).
International Search Report for International Application No. PCT/EP2012/053245, filed on Feb. 27, 2012, on behalf of Saint-Gobain Glass France, dated May 11, 2012. 5 pages. (English Translation + German Original).
International Search Report for International Application No. PCT/EP2016/056974, filed Mar. 30, 2016 on behalf of Saint-Gobain Glass France, dated Jun. 3, 2016. 7 pages (German Original + English Translation).

(56) References Cited

OTHER PUBLICATIONS

International Search Report issued for International Application No. PCT/EP2016/056975, filed Mar. 30, 2016 on behalf of Saint-Gobain Glass France, dated Jun. 13, 2016. 7 pages (German Original + English Translation).
Japanese Office Action for Japanese Application No. 2017-552950 filed on Oct. 6, 2017 on behalf of Saint-Gobain Glass France, dated Nov. 8, 2018. 9 pages. (Japanese Original + English Translation).
Japanese Office Action for Japanese Application No. 2017-552951 filed on Oct. 6, 2017 on behalf of Saint-Gobain Glass France, dated Nov. 21, 2018. 6 pages. (Japanese Original + English Translation).
Korean Office Action for Korean Application No. 10-2017-7027615 filed on Sep. 28, 2017 on behalf of Saint-Gobain Glass France, dated Jul. 19, 2018. 11 pages. (Korean Original—English Translation).
Notice of Allowance for U.S. Appl. No, 14/110,124, filed Nov. 21, 2013, on behalf of Saint-Gobain Glass France, dated Sep. 18, 2015. 13 pages.
Restriction Requirement for U.S. Appl. No. 14/110,124, filed Nov. 21, 2013, on behalf of Saint-Gobain Glass France, dated Jun. 10, 2015. 11 pages.
Written Opinion for International Application No, PCT/EP2015/078342 filed Dec. 2, 2015 on behalf of Saint-Gobain Glass France, dated Mar. 8, 2016. 10 pages. (English Translation + German Original).
Written Opinion for International Application No, PCT/EP2012/053245, filed on Feb. 27, 2012, on behalf of Saint-Gobain Glass France, dated May 11, 2012. 15 pages.
Written Opinion for International Application No. PCT/EP2016/056974 filed Mar. 30, 2016 on behalf of Saint-Gobain Glass France, dated Jun. 3, 2016. 12 pages. (English Translation + German Original).
Written Opinion for International Application No. PCT/EP2016/056975 filed Mar. 30, 2016 on behalf of Saint-Gobain Glass France, dated Jun. 13, 2016. 12 pages. (English Translation + German Original).

* cited by examiner

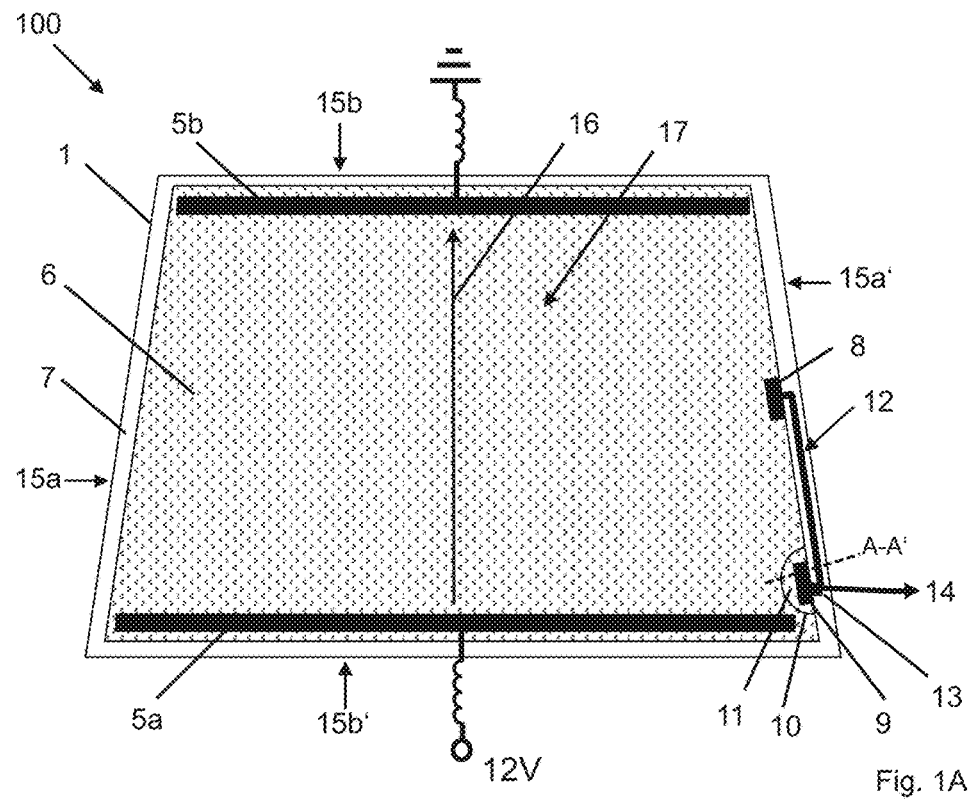
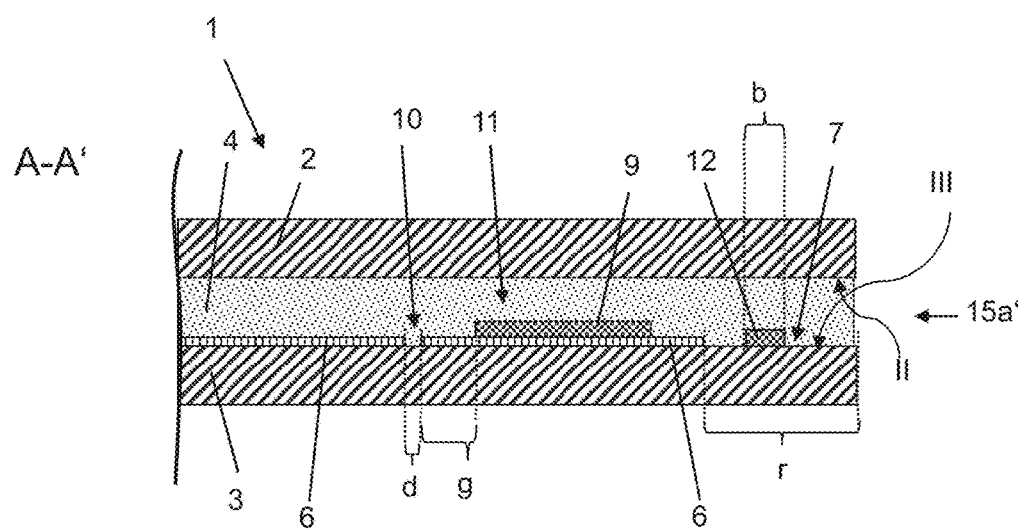
Fig. 1A
Fig. 1B

ELECTRICALLY HEATABLE WINDSCREEN ANTENNA, AND METHOD FOR PRODUCING SAME

CROSS REFERENCE TO RELATED APPLICATIONS

The present application is the U.S. national stage entry of International Patent Application No. PCT/EP2015/078342, filed internationally on Dec. 2, 2015, which, in turn, claims priority to European Patent Application No. 14198258.7, filed on Dec. 16, 2014.

The invention is in the field of pane technology and relates to an electrically heatable antenna pane as well as a method for its production and its use.

Panes mit transparent, electrically conductive coatings have already been described frequently in the patent literature. Reference is made, merely by way of example, to the publications DE 198 58 227 C1, DE 10 2008 018 147 A1, and DE 10 2008 029 986 A1. As a rule, the conductive coating serves for reflection of heat rays and provides, for example, in motor vehicles or in buildings, for an improvement in thermal comfort. Often, it is also used as a heating layer to heat the entire surface of a transparent pane.

Electrically conductive coatings can, due to their electrical conductivity, also be used as planar antennas for receiving electromagnetic waves, as is disclosed in DE 10 106 125 A1 DE 103 19 606 A1, DE 10 2012 008 033 A1, EP 0 720 249 A2, EP 2 400 591 A1, and US 2003/0112190 A1. For this, the conductive coating is galvanically or capacitively coupled to an antenna connection as a coupling electrode and makes the antenna signal available in the edge region of the pane. Via a connection conductor, typically with the interconnection of an antenna amplifier, the antenna signals are fed to a receiving device. Customarily, unshielded stranded wires or foil conductors that have relatively low ohmic resistance and cause only slight ohmic power losses are used as connection conductors. However, such connection conductors permit no defined signal transmission since, due to inevitable position tolerances, undefined couplings with the electrically conductive motor vehicle body or nearby conductors can develop such that the fluctuation range of important antenna characteristics such as bandwidth, efficiency, and foot point impedance is relatively great. For this reason, such unshielded conductors must be kept as short as possible.

Through the use of special high-frequency conductors that include, in addition to a signal conductor, at least one ground conductor (such as coaxial conductors, coplanar conductors, microstrip conductors), signal losses can be avoided. However, such high-frequency conductors are complex and cost intensive and require a relatively large installation space. Moreover, they require equally complex connection technology. In motor vehicles, the antenna amplifier is usually electrically connected to the electrically conductive motor vehicle body, with a reference potential (ground) for the antenna signal effective in terms of high-frequency technology being defined by this electrical connection. The difference between the ground potential and the antenna signal potential yields the usable antenna power.

The electrically conductive coating can serve as a plane-shaped antenna, hereinafter also referred to as a planar antenna, for receiving or transmitting electromagnetic waves. In contrast to and distinct from the planar antenna, line-shaped antennas, so-called "linear antennas", have, for receiving electromagnetic waves, a geometric length (L) that exceeds their geometric width (B) by several orders of magnitude. The geometric length of a linear antenna is the distance between the antenna foot point and the antenna tip; the geometric width is the dimension perpendicular thereto. For linear antennas, the relationship $L/B \geq 100$ usually applies. The same applies with linear antennas to their geometric height (H), understood as a dimension that is both perpendicular to the length (L) and perpendicular to the width (B); usually, the relationship: $L/H \geq 100$ applies.

The antennas built into conventional windshields (not outfitted with an electrically conductive coating) are of the linear antenna type since they must be allowed to be used even in windshields of motor vehicles subject to the condition, in compliance with legal regulations, that they do not negatively affect the driver's view. This can be accomplished, for example, by means of fine wires with a diameter of, typically, 10 µm to 150 µm. A satisfactory antenna signal can be provided in the range of the terrestrial bands II to V by linear antennas. According to a definition of the International Telecommunication Union (ITU), this is the frequency range from 87.5 MHz to 960 MHz (band II: 87.5-100 MHz, band III: 162-230 MHz, band IV: 470-582 MHz, band V: 582-960 MHz). However, with linear antennas in the preceding frequency range of band I (41-68 MHz) and with customary sizes for windshields in motor vehicles, very good reception performance can no longer be obtained. The same also applies to frequencies below band I.

On the other hand, with the planar antenna, particularly good reception performance can be obtained in the frequency range of band I and reception performance comparable to the linear antenna can be obtained in the frequency range of band II. However, the reception performance of the planar antenna deteriorates at higher frequencies due to the relatively high electrical sheet resistance of the conductive coating. In motor vehicles, there is the additional cause of a strong capacitive coupling between the conductive coating and the electrically conductive motor vehicle body. It is possible to counteract this problem by means of a coating-free edge region, which, however, cannot be arbitrarily wide since the transition into the edge region is to be concealed by an opaque masking strip for a visually acceptable result. On the other hand, the other functions of the conductive coating, such as its heat ray reflecting property, deteriorate with a widening of the edge region. Consequently, in practice, the edge region typically has a width of 10 mm or less.

Improved reception performance can be achieved with an antenna pane in which, through segmentation of the electrically conductive coating in an edge zone of the pane, an increase in the active distance effective from a high-frequency technology standpoint between the conductive coating and the electrically conductive motor vehicle body is achieved, as is disclosed in WO 2010/081589 A1.

A further improvement can be obtained with a bandwidth-optimized antenna pane with a hybrid structure consisting of a planar antenna and a linear antenna, as is disclosed in WO 2001/144680 A1.

It would also be conceivable to improve the reception performance of the planar antenna by means of a reduction in the electrical sheet resistance. This requires increasing the layer thickness of the conductive coating, which is, however, always associated with a reduction in optical transmittance and, practicability notwithstanding, is possible only to a limited extent due to legal regulations.

With an electrically heatable antenna pane, all the aforementioned improvements of reception performance and of bandwidth must be compatible with the heating function, which is, as a rule, accompanied by structural restraints.

In contrast, the object of the present invention consists in providing an electrically heatable antenna pane with satisfactory reception performance, wherein the antenna function does not substantially impair the heating function. This and other objects are accomplished according to the proposal of the invention by an antenna pane according to the invention with the characteristics of the independent claim. Advantageous embodiments of the invention are indicated by the characteristics of the subclaims.

The electrically heatable antenna pane according to the invention comprises at least:
- one transparent pane,
- one electrical heating layer that extends at least over a portion of a pane surface and that can serve, at least section-wise, as a planar antenna for receiving and/or transmitting electromagnetic waves,
- at least one first busbar and one second busbar, with the busbars electrically connectable to a voltage source and with the heating layer electrically conductingly connected in direct contact such that after application of a supply voltage, a heating current flows over a heating field formed by the heating layer,
- one first antenna connection that is electrically conductingly connected to the heating layer in direct contact,
- one second antenna connection that is electrically conductingly connected to a section of the heating layer in direct contact, wherein the section is electrically insulated against direct currents, by a heating-layer-free separation region, from the rest of the heating layer and the section is capacitively coupled to the adjacent heating layer for the transmission of antenna signals.

In the context of the invention, the fact that "an antenna connection is electrically conductingly connected in direct contact" means that at least one subregion of the electrically conductive region of the antenna connection is in direct contact with a subregion of the electrically conductive coating of the heating layer. The antenna connection is thus galvanically connected to the heating layer.

The invention is based on the following principle: electrically heatable antenna panes have, in the simplest case, a heating layer that is contacted by two busbars. In addition, the heating layer is contacted by an antenna connection to pick up the antenna signal received by the heating layer as a planar antenna.

Due to the high ohmic sheet resistance of the heating layer, the region of the heating layer active as a planar antenna is limited to a narrow region around the antenna connection. The area acting as a planar antenna consists—depending on frequency—only of a radius of a few decimeters around the antenna connection.

It would, consequently, be very advantageous to use, by means of a second antenna connection that is electrically connected to the heating layer in direct contact, an additional region of the heating layer as a planar antenna. Moreover, it would be advantageous to bring together the antenna signal of the second antenna connection if possible on the pane via a connecting conductor with the antenna signal of the first antenna connection such that only one antenna line outward to the antenna amplifier is necessary; and, thus, line losses and the complexity of circuitry and amplifier can be minimized. Also for the design of so-called "slot antennas" within the conductive layer, it can be advantageous to work with two contacts galvanically connected to the heating layer.

Since, at the time of electrical heating, i.e., upon application of a supply voltage to the busbars, the heating layer forms a heating field with a specific potential curve, tight limits are set for the positioning of the two antenna connectors: Both must be arranged in equipotential regions of the heating field. If this were not the case, the connecting conductor of the two antenna connections would result in an equalization of potential between the two antenna connections and, thus, in a short-circuit of the heating layer in the heating field. Thus, the heating function of the antenna pane would be clearly reduced and undesirable locally overheated sites, so-called "hotspots", would develop.

This problem is resolved by a separation region according to the invention that insulates a section of the heating layer from the adjacent heating layer galvanically, i.e., against direct currents. At the same time, the separation region is dimensioned such that the section with the adjacent heating layer is capacitively coupled for the transmission of antenna signals.

The electrically heatable antenna pane of the present invention comprises at least one transparent pane that is formed by an electrically insulating, transparent substrate. An electrical heating layer consisting of an electrically conductive, transparent coating covers at least a portion of a pane surface and serves, at least section-wise, as a plane-shaped antenna (also referred to in the following as a planar antenna or flat emitter) for receiving electromagnetic waves. The heating layer extends, in particular, over the (central) field of vision of the pane and is electrically connectable by means of electrical connection means to a voltage source. The connection means have antenna connections that are provided for connecting to the two terminals of a voltage source. In addition, the connection means include at least two busbars, which serve for introducing a heating current into the heating layer and which are electrically connected to the heating layer such that, after application of the supply voltage, a heating current flows over a heating field formed by the heating layer. The busbars can be implemented, for example, in the form of metallic strip electrodes or band electrodes ("busbars"), in order to introduce the heating current widely distributed into the heating layer. Preferably, the busbars are, in each case, electrically conductingly connected to the heating layer over their full band length in direct contact. Compared to the high-ohmic heating layer, the busbars have relatively little or low-ohmic electrical resistance. In an advantageous embodiment of the invention, the busbars are made of a metal-containing printing paste that is, for example, printed by screenprinting onto the heating layer. From an industrial standpoint, this measure can be performed particularly simply and economically.

The heating layer is suitably implemented for use as a planar antenna and can, to that end, cover the pane extensively. The antenna pane includes at least one first antenna connection electrically coupled to the heating layer to couple out antenna signals from at least one region of the heating layer, which acts as a planar antenna. The first antenna connection is galvanically coupled to the heating layer and is preferably in direct mechanical and electrical contact with the heating layer.

Furthermore, the antenna pane includes a second antenna connection that is electrically conductingly connected to a section of the heating layer in direct contact. The section is electrically isolated from the rest of the heating layer against direct currents by a heating-layer-free separation region and capacitively coupled to the adjacent heating layer for the transmission of antenna signals. The heating-layer-free separation region is, advantageously, a thin line in which the heating layer has been removed, for example, by laser ablation. From an industrial standpoint, this can be performed particularly simply and economically.

In an advantageous improvement of the antenna pane according to the invention, at least one connecting conductor galvanically connects the first antenna connection and the second antenna connection to one another. Via this connection, the antenna signals that are coupled out of the heating layer by the two antenna connections can be guided together in a common antenna foot point with low losses.

In an advantageous improvement of the antenna pane according to the invention, a connecting conductor is arranged on the pane and, in particular, on the pane surface on which the heating layer also extends. Here, the connecting conductor is preferably arranged on a heating-layer-free edge region of the pane surface. This has the particular advantage that the connecting conductor is arranged at a distance from the heating surface and antenna signals can be guided virtually undisturbed via the connecting conductor.

In an advantageous improvement of the antenna pane according to the invention, the connecting conductor is implemented, at least section-wise, as an unshielded, linear antenna conductor. The antenna conductor serves as a linear antenna for receiving electromagnetic waves and is suitably implemented for this purpose, i.e., It has a form suitable for receiving in the desired frequency range. As a linear antenna, the connecting conductor meets the conditions mentioned in the introduction with regard to its dimension in the direction of extension (length L) and the two dimensions perpendicular thereto (width B, height H). The connecting conductor can, for example, be implemented in the form of a wire or as a flat conductor and particularly preferably as a print made of a metal-containing printing paste.

To ensure optimal antenna function, the unshielded, linear antenna conductor is arranged outside an area defined by a projection operation, which area is defined in that every point of the area is projectable by an orthogonal parallel projection onto the heating layer or planar antenna serving as a projection area. Since the heating layer is active only section-wise as a planar antenna, only the portion of the heating layer active as a planar antenna serves as the projection area. The linear antenna conductor is thus not situated in the area defined by the projection operation. As customary, in the parallel projection, the projection beams are parallel to one another and strike the projection area at a right angle, which area is defined in the present case by the heating layer serving as a planar antenna or its portion active as a planar antenna, with the projection center at infinity. In the case of a flat pane and an accordingly flat heating layer, the projection area is a projection plane containing the heating layer. Said space is bordered by an (imaginary) edge surface that is positioned on the terminalferential edge of the heating layer or on the terminalferential edge of the portion of the heating layer acting as a planar antenna and is perpendicular to the projection area.

In the antenna pane according to the invention, an antenna foot point of the linear antenna becomes a common antenna foot point of the linear and the planar antenna. As usual, the term "antenna foot point" describes an electrical contact for picking up antenna signals received, on which, in particular, there is a reference to a reference potential (for example, ground) for determining the signal level of the antenna signals.

The antenna pane according to the invention thus has, in this exemplary embodiment, two planar antennas and one linear antenna that are electrically coupled to one another, which is referred to in the context of the present invention as a "hybrid antenna structure". It advantageously enables good reception performance with a high bandwidth, which combines the favorable reception characteristics of the various regions of the heater layer active as a planar antenna in the frequency ranges of bands I and II with the favorable reception characteristics of the linear antenna of the connecting conductor in the frequency ranges of bands II to V. By means of the positioning of the linear antenna outside the area projectable by orthogonal parallel projection on the planar antenna, electrical load of the linear antenna by the planar antenna(s) can be avoided in a particularly advantageous manner. The hybrid antenna structure according to the invention thus makes available the entire frequency range of bands I to V with satisfactory reception performance, for example, for a windshield serving as an antenna pane. In industrial series production, the hybrid antenna structure can be produced simply and economically using current manufacturing techniques.

In another advantageous embodiment of the antenna pane according to the invention, the connecting conductor implemented as a linear antenna conductor is specifically adapted for reception in the range of the terrestrial bands III-V and preferably has, for this purpose, a length of more than 100 millimeters (mm) and a width of less than 1 mm as well as a height of less than 1 mm, corresponding to a relationship length/width≥100 or L/H≥100. For the desired purpose, it is further preferred for the connecting conductor to have linear conductivity of less than 20 ohm/m, particularly preferably less than 10 ohm/m.

In another advantageous embodiment of the antenna pane according to the invention, the common antenna foot point of the planar and linear antenna is electrically conductingly connectable via a connection conductor to an electronic signal processing device for processing antenna signals received, for example, an antenna amplifier, with the connection contact arranged such that the length of the connection conductor is as short as possible. This measure advantageously makes it possible that for the connection conductor, it is not compulsory to use a specific high-frequency conductor with a signal conductor and at least one accompanying ground conductor, but rather that due to the short signal transmission path, an economical signal conductor not intended specifically for high-frequency transmission, such as an unshielded stranded wire or strip-shaped flat conductor, which is also connectable using relatively uncomplex connection technology, can be used. Thus, costs can be saved to a significant extent in the production of the antenna.

In an advantageous improvement of an antenna pane according to the invention, either the first antenna connection or the second antenna connection is electrically conductingly connected to the first busbar or to the second busbar in direct contact. This is particularly advantageous since the respective antenna connection need not be made separately and takes up no additional area of the heating layer. In order to prevent short-circuits or accidental ground faults, the respective first busbar and/or second busbar is preferably decoupleable via two filters using high-frequency technology for antenna signals from the voltage source and the vehicle body ground.

In an advantageous improvement of an antenna pane according to the invention, the heating-layer-free separation region has a distance g of 0 mm to 200 mm, preferably of 0.1 mm to 100 mm from the second antenna connection. It is particularly advantageous for the section of the heating layer insulated by the separation region to have an area equal to or less than 10%, preferably equal to or less than 5% and particularly preferably equal to or less than 1% of the entire area of the heating layer.

In an advantageous improvement of an antenna pane according to the invention, the separation region has a width d of 25 µm to 300 µm and preferably 30 µm to 140 µm. Separation regions with this width offer the advantage of precise and simple electrical insulation and are, at the same time, hardly visible to the human eye. At the same time, their capacitive coupling is sufficient to transmit antenna signals of the heating layer out of the section bounded by the separation region into the section itself and thus to feed them to the second antenna conductor. The separation region is preferably implemented linear and with a constant width d. Such separation regions can be produced particularly simply, for example, by laser ablation.

In another advantageous embodiment, the antenna pane according to the invention is implemented in the form of a laminated pane. The laminated pane includes two transparent individual panes, which correspond to an inner and an outer pane, which are fixedly bonded to one another by at least one thermoplastic adhesive layer. In this case, the heating layer can be situated on at least one surface of at least one of the two individual panes of the laminated pane. In addition, the laminated pane can be provided with a carrier layer, for example, a PET films, which is situated between the two individual panes. The carrier layer can serve, in addition to or alternatively to the individual panes, as a carrier for the heating layer, with at least one surface of the carrier layer being provided with the heating layer. By means of this measure, the antenna pane according to the invention can be realized technically in a particularly simple manner.

In another advantageous embodiment of the antenna pane according to the invention, the heating layer is situated on one surface of the at least one pane and the connecting conductor on a different surface thereof or on a surface of a different pane. By means of this measure, particularly simple production of the antenna pane according to the invention can be realized.

In an advantageous embodiment of the antenna pane according to the invention, the first antenna connection, the second antenna connection, and/or the connecting conductor are made from a metal wire or a metal foil.

In an alternative advantageous embodiment of the antenna pane according to the invention, the first antenna connection, the second antenna connection, and/or the connecting conductor are made from an electrically conductive printing paste that is preferably applied by screenprinting on that pane surface on which the heating layer is arranged. By means of this measure, particularly simple and economical production of the antenna pane according to the invention can be realized. Such electrically conductive printing pastes preferably contain metal and, in particular, contain silver, and can, moreover, contain glass frits.

In another advantageous embodiment of the antenna pane according to the invention, the first antenna connection, the second antenna connection, the busbars, and/or the connecting conductor are concealed by an opaque masking layer, by which means the visual appearance of the antenna pane can be improved.

In another advantageous embodiment of an antenna pane according to the invention, the heating layer includes at least two other planar segments that are insulated from one another by at least one electrically insulating separation line. It is particularly advantageous for a particular terminalferential edge zone of the heating layer to have a plurality of planar segments that are divided by electrically isolating separation lines. Such a configuration of the heating layer is described in detail in the publications WO 2010/081589 A1 and WO 2001/144680 A1 already mentioned in the introduction. To avoid repetition, reference is made to the disclosure of these applications in their entirety, which as thus to be considered part of the description of the present invention. In particular, reference is made to the design of the planar segments in function and form disclosed there.

In an advantageous improvement of an antenna pane according to the invention, each of the planar segments has an area of 0.1 mm$^2$ to 100.0 mm$^2$, preferably of 1.0 mm$^2$ to 50.0 mm$^2$, and particularly preferably of 1.0 mm$^2$ to 25.0 mm$^2$.

In another advantageous improvement of an antenna pane according to the invention, the connecting conductor is arranged, at least section-wise, on a region formed by the planar segments. In other words, the connecting conductor is arranged within an area that is projectable by orthogonal parallel projection onto the region serving as a projection area with planar segments. Since the region of planar segments divides the heating layer such that it is no longer active from a high-frequency technology standpoint as a planar antenna, the region decouples the heating layer from a, for example, surrounding motor vehicle body or a connecting conductor arranged thereon. Since the region of planar segments is visually very inconspicuous, it need not necessarily be concealed by a masking print, which results in a larger area of vision through the pane.

In another advantageous improvement of an antenna pane according to the invention, the separation line that divides the planar segment has a width d of 25 µm to 300 µm and preferably 30 µm to 140 µm. Separation lines with this width offer the advantage of precise and simple electrical insulation and are, at the same time, hardly visible to the human eye.

The invention further includes a method for producing an electrically heatable antenna pane, wherein at least a) one electrical heating layer is deposited on at least one portion of a pane surface of a transparent pane,
b) one section of the heating layer is divided by a separation region electrically insulating against direct currents,
c) at least one first busbar and one second busbar are applied on the heating layer, wherein the busbars are electrically conductingly connected to the heating layer in direct contact such that after application of a supply voltage from a voltage source on the busbars, a heating current can flow via a heating field formed by the heating layer,
d) one first antenna connection is applied on the heating layer and is electrically conductingly connected to the heating layer in direct contact,
e) one second antenna connection is applied within the section on the heating layer and is electrically conductingly connected to the heating layer in direct contact, by which means the second antenna conductor is capacitively coupled to the heating layer bordering the section for the transmission of antenna signals,
f) one connecting conductor is applied on the pane, by which means the first antenna connection and the second antenna connection are galvanically connected to one another.

In an advantageous embodiment, the heating layer is removed by laser ablation in the separation region. This is particularly advantageous since by means of laser ablation, precise and reliable insulation against direct currents can be obtained, and, at the same time, the separation region can be very finely designed such that it is hardly perceptible to the human eye and vision through the pane is hardly impaired.

Moreover, the separation region is so narrow that the separated section is capacitively coupled for the transmission of antenna signals to the heating layer bordering the section.

In a particularly advantageous embodiment of the method according to the invention, the busbars, the first antenna connection, the second antenna connection, and the connecting conductor are applied by screenprinting an electrically conductive printing paste onto that pane surface on which the heating layer was arranged. This type of production is particularly economical and industrially simple to perform. Here, it is particularly advantageous for the process steps c), d), e), and f) to be performed simultaneously in one screenprinting process. This is particularly economical and quick to perform.

The invention further extends to the use of an antenna pane as described above as a functional and/or decorative individual piece and as a built-in component in furniture, devices, and buildings, as well as in means of transportation for travel on land, in the air, or on water, in particular in motor vehicles, for example, as a windshield pane, rear window pane, side pane, and/or glass roof.

It is understood that the various embodiments of the antenna pane according to the invention can be realized individually or in any combinations. In particular, the characteristics mentioned above and explained in detail in the following can be used not only in the combinations indicated, but also in other combinations or alone without departing from the scope of the present invention.

The invention is now explained in detail using exemplary embodiments with reference to the accompanying figures. They depict, in simplified, not to scale representation:

FIG. 1A a plan view of a schematic representation of an exemplary embodiment of an antenna pane according to the invention;

FIG. 1B a cross-sectional view along the section line A-A' of the exemplary embodiment of the antenna pane according to the invention of FIG. 1A;

FIG. 2 a plan view of a schematic representation of an alternative exemplary embodiment of an antenna pane according to the invention;

FIG. 3A a plan view of a schematic representation of another alternative exemplary embodiment of an antenna pane according to the invention;

FIG. 3B a cross-sectional view along the section line A-A' of the exemplary embodiment of the antenna pane according to the invention of FIG. 3A;

FIG. 3C an enlarged view of the detail Z of the exemplary embodiment of the antenna pane according to the invention of FIG. 3A; and FIG. 4 a flowchart of an exemplary embodiment of the method according to the invention.

FIG. 1A depicts a first exemplary embodiment of an electrically heatable antenna pane 100 according to the invention. Here, the antenna pane 100 is, for example, implemented as a transparent pane 1 of the laminated pane type. The laminated pane 1 is transparent to visible light, for example, in the wavelength range from 350 nm to 800 nm, with the term "transparency" meaning light permeability of more than 50%, preferably more than 70%, and particularly preferably more than 75%. The laminated pane 1 serves, for example, as a windshield of a motor vehicle; however, it can also be used otherwise.

FIG. 1B depicts the schematic structure of the laminated pane 1 with reference to a cross-section along the section line A-A' of FIG. 1A.

The laminated pane 1 comprises two transparent individual panes, namely, a rigid outer pane 2 and a rigid inner pane 3 that are fixedly bonded to one another via a transparent thermoplastic adhesive layer 4. The individual panes have roughly the same size and are made, for example, from glass, in particular, float glass, cast glass, and ceramic glass, being equally possibly made from a nonglass material, for example, plastic, in particular polystyrene (PS), polyimide (PA), polyester (PE), polyvinyl chloride (PVC), polycarbonate (PC), polymethyl methacrylate (PMA), or polyethylene terephthalate (PET). Generally speaking, any material with sufficient transparency, adequate chemical resistance, as well as suitable shape and size stability can be used. For use elsewhere, for example, as a decorative piece, it would also be possible to produce the outer and inner panes 2, 3 from a flexible material. The respective thickness of the outer and inner panes 2, 3 can vary widely depending on the application and can, for glass, for example, be in the range from 1 to 24 mm.

The laminated pane 1 has an at least approximately trapezoidal curved contour (in FIG. 1A, the laminated pane is shown simplified in a trapezoidal shape) that results from a pane edge common to the two individual panes 2, 3. The pane edge is composed of two opposing long pane edges 15a,15a' and two opposing short pane edges 15b,15b'. As is customary, the pane surfaces are referenced with the roman numerals I-IV, with "side I" corresponding to a first pane surface of the outer pane 2, "side II" to a second pane surface of the outer pane 2, "side III" to a third pane surface of the inner pane 3, and "side IV" to a fourth pane surface of the inner pane 3. In the application as a windshield, side I is oriented toward the external environment and side IV is oriented toward the passenger compartment of the motor vehicle.

The adhesive layer 4 for bonding the outer pane 2 and the inner pane 3 preferably consists of an adhesive plastic, preferably based on polyvinyl butyral (PVB), ethylene vinyl lactate (EVA), and polyurethane (PU). Of course, the adhesive layer 4 can also be implemented as a bilayer or multilayer in the form of two or more identical or different adhesive layers, for example, two PVB films.

In the exemplary embodiment shown in FIG. 1A, a heating layer 6 in the form of a transparent, electrically conductive coating is applied on the pane surface III of the inner pane 3, which coating is bordered on all sides by a terminalferential heating-layer-free edge region 7. The heating layer 6 covers an area that is more than 50%, preferably more than 70%, and even more preferably more than 90% of the pane surface III of the inner pane 3. The area covered by the heating layer 6 is preferably more than 1 $m^2$ and can be, generally speaking, notwithstanding the use of the laminated pane 1 as a windshield, for example, in the range from 100 $cm^2$ to 25 $m^2$. The heating layer 6 contains or is made of at least one electrically conductive material. Examples for this are metals with high electrical conductivity such as silver, copper, gold, aluminum, or molybdenum, metal alloys such as silver alloyed with palladium, as well as transparent electrically conductive oxides (TCO=transparent conductive oxides). Preferred TCOs are indium tin oxide, fluoride-doped tin dioxide, aluminum-doped tin dioxide, gallium-doped tin dioxide, boron-doped tin dioxide, tin zinc oxide, or antimony-doped tin oxide.

The heating layer 6 can consist of one individual layer with such a conductive material or of a layer sequence that contains at least one such individual layer. For example, the layer sequence can comprise at least one layer made of a conductive material and at least one layer made of a dielectric material. The thickness of the heating layer 6 can, depending on the application, vary widely, with the thickness at any point, for example, being in the range from 30 nm to 100 μm. In the case of TCOs, the thickness is preferably in the range from 100 nm to 1.5 μm, preferably in the range from 150 nm to 1 μm, particularly preferably in the range from 200 nm to 500 nm. When the heating layer 5 consists of a layer sequence with at least one layer made of an electrically conductive material and at least one layer made of a dielectric material, the thickness is preferably 20 nm to 100 μm, more preferably 25 nm to 90 μm, and particularly preferably 30 nm to 80 μm. Advantageously, the layer sequence is thermally highly stable such that it withstands, without damage, the temperatures required for the bending of glass panes of typically more than 600° C.: however, even layer sequences with low thermal stability can be provided. The sheet resistance of the heating layer 6 is preferably less than 20 ohms specific sheet resistance and is, for example, in the range from 0.5 to 20 ohms specific sheet resistance. In the exemplary embodiment depicted, the sheet resistance of the heating layer 6 is, for example, 0.7 ohms.

The heating layer 6 is preferably deposited from the gas phase, for which purpose methods known per se, such as chemical vapor deposition (CVD) or physical vapor deposition (PVD) can be used. Preferably, the heating layer 6 is applied by sputtering (such as magnetron cathode sputtering).

The heating-layer-free edge region 7 serves in particular for electrical insulation of the heating layer 6 toward the outside, for example, for the reduction of a capacitive coupling with the electrically conductive motor vehicle body, made, as a rule, from sheet metal. In addition, the heating layer 6 is protected against moisture penetrating from the pane edge 15a,15a,15b,16b' and thus against corrosion. The width r of the terminalferential edge regions 7 can vary widely. Preferably, the width r of the edge region 7 is from 0.2 cm to 5 cm, preferably from 0.3 cm to 2 cm, and particularly preferably from 0.4 cm to 1.3 cm. The edge region 7 can be produced by after-the-fact removal of the heating layer 6, for example, by mechanical abrasive ablation (such as grinding), laser ablation, or etching, or by masking of the inner pane 3 before the application of the heating layer 6 on the pane surface III.

Along the lower pane edge 15b', a first busbar 5a is arranged on the heating layer 6 and is electrically conductingly connected thereto. Along the upper pane edge 15b, a second busbar 5b is arranged on the heating layer 6 and is likewise electrically conductingly connected thereto. The busbars 5a, 5b are known per se and are made, for example, from a metal strip or a printed electrically conductive silver print. The two busbars 5a,5b are connected here, for example, centrally, in each case to a connector, to which the busbars 5a,5b can be connected via feed lines to a voltage source. The voltage source is, for example, an onboard electrical system of a motor vehicle or is connected via voltage transformers to an onboard electrical system of a motor vehicle. In this example, the first busbar 5a is connected to the positive terminal of a 12V voltage source, and the second busbar 5b is connected to an associated ground potential or reference potential. Here, filters are arranged between a first busbar 5a and a positive terminal as well as between a second busbar 5b and a ground potential in order to prevent interference from the onboard electrical system on the antenna, on the one hand, and a high-frequency-related unwanted grounding of the antenna via the heating layer.

The application of a voltage on the busbars 5a, 5b results in the formation of a heating current 16 that flows via a heating field 17 of the heating layer 6 situated between the busbars 5a,5b and and heats it by ohmic resistance heating. The resultant current path of the heating current 16 is, for example, indicated by an arrow. It runs substantially along the shortest connection between the busbars 5a, 5b. With complex pane geometries, with more than two busbars, and taking into account the intrinsic ohmic resistance of the busbars 5a,5b, the current path can have a curved course. The precise, actual current paths can be determined in a simple manner by the person skilled in the art, for example, through simulations.

In the laminated pane 1 according to the invention, the heating layer 6 serves as a planar antenna for receiving electromagnetic waves, preferably in the frequency range of the terrestrial radio bands I and II. For this purpose, the heating layer 6 is electrically coupled to a first antenna connection 8. In the exemplary embodiment, the first antenna connection 8 is galvanically coupled, by direct contact, to the heating layer 6. The strip-shaped first antenna connection 8 contains, for example, a metallic material, preferably silver, and is, for example, printed on using screenprinting. It preferably has a length of more than 5 mm with a width of 5 mm or more, preferably a length of more than 25 mm with a width of 5 mm or more. In the exemplary embodiment, the first antenna connection 8 has a length of 25 mm and a width of 8 mm. The thickness of the first antenna connection 8 is preferably less than 0.015 mm. The specific conductivity of a silver-containing printed first antenna connection 8 is, for example, 61.35·106/ohm·m.

In the exemplary embodiment depicted, the first antenna connection 8 is arranged on and thus in direct electrical contact with the heating layer 6 roughly parallel to the heating-layer-free edge region 7 and roughly centrally relative to the right pane edge 15a'. Here, the first antenna connection 8 is implemented such that the antenna signals of the planar antenna, which are received by the heating layer 6 the vicinity of the first antenna connection 8, can be picked up at the first antenna connection 8.

In order to improve the antenna function of the planar antenna, the heating layer 6 is electrically coupled to a second antenna connection 9. In the exemplary embodiment, the second antenna connection 9 is galvanically coupled, by direct contact, to the heating layer 6. The, for example, strip-shaped second antenna connection 9 is likewise made, for example, of a metallic material, preferably silver, and is, for example, printed by screenprinting. It preferably has a length of more than 10 mm with a width of 5 mm or more, preferably a length of more than 25 mm with a width of 5 mm or more. In the exemplary embodiment, the second antenna connection 9 has the same dimensions as the first antenna connection 8 and, thus, a length of 25 mm and a width of 8 mm. The thickness of the second antenna connection 9 is preferably less than 0.015 mm. The specific conductivity of a silver-containing printed second antenna connection 9 is, for example, 61.35·106/ohm·m.

As is depicted in FIG. 1B, the second antenna connection 9 runs on and, thus, in direct electrical contact with, the heating layer 6 roughly parallel to the heating-layer-free edge region 7 and roughly at the lower right pane edge 15a', in the vicinity of the first busbar 5a. Here, the second antenna connection 9 is arranged such that the antenna signals of the planar antenna that are received by the heating layer 6 in the vicinity of the second of the second antenna connection 9 can be picked up on the second antenna connection 9. The direct electrical contact of the second antenna conductor with the heating layer 6 is situated in a section 11 of the heating layer 6 that is electrically isolated by a heating-layer-free separation region 10 from the rest of the heating layer 6. The separation region 10 is implemented here, for example, linear and with a constant width. It has a width d of only, for example, 100 μm and is preferably generated by laser ablation. The separation region 10 runs roughly in a semicircle around the second antenna connection 9 and is bordered by the heating-layer-free edge region 7. By means of the narrow width d of the separation region 10 of only 100 μm, the electrically isolated section 11 of the heating layer 6 is capacitively coupled, using high-frequency technology, to the adjacent heating layer 6 such that the antenna signals of the planar antenna that are received by the heating layer 6 in the vicinity of the second antenna connection 9 inside and outside of the section 11 can be picked up at the second antenna connection 9. Because of the semicircular design of the separation region 10, the heating current 16 in the heating field 17 is affected only to a small extent and the homogeneity of the heating power distribution and temperature distribution are impaired only to a small extent during heating.

The separation region 10 according to the invention, which electrically isolates the section 11 from the rest of the heating layer 6, ensures that no difference in potential between the first antenna connection 8 and the second antenna connection 9 occurs. This would be the case if no separation region 10 were present since the antenna connections 8,9 are at different distances from the busbars 5a,5b in the heating field 17. Because of the potential separation of the separation region 10, the antenna signals that are guided to the first antenna connection 8 and the antenna signals that are guided to the second antenna connection 9, are routed to the antenna amplifier 14 via a common antenna foot point 13 and a common antenna conductor.

The connection of the two antenna signals is done here by a connecting conductor 12, which is also arranged here on the pane surface III of the inner pane 3. In the example depicted, the connecting conductor 12 is arranged in the heating-field-free edge region 7 and, consequently, need not be electrically insulated.

The connecting conductor 12 is implemented here as a linear, unshielded antenna conductor that serves as a linear antenna for receiving electromagnetic waves, preferably in the frequency range of the terrestrial radio bands II to V, particularly preferably in the frequency range of the radio bands III to V and is suitable for this purpose. In the present exemplary embodiment, the connecting conductor 12 is also printed on the pane surface III as a screenprint of a silver-containing screenprinting paste and has, for example, a width b of 300 μm, a height of 10 μm, and a length of 550 mm. The linear conductivity of the connecting conductor 12 is preferably less than 20 ohm/ m, particularly preferably less than 10 ohm/m. In the exemplary embodiment depicted, the length of the connecting conductor 12 is ca. 300 mm with a width of 0.75 mm. Its linear conductivity is, for example, 5 ohm/m.

Alternatively, the connecting conductor 12 can also be implemented in the form of a wire that is preferably longer than 100 mm and thinner in diameter than 400 μm. The linear conductivity of the connecting conductor 12 is then preferably less than 20 ohm/m, particularly preferably less than 10 ohm/m.

In the exemplary embodiment depicted in FIG. 1A, the connecting conductor 12 has an at least approximately straight-lined course and is situated completely within the heating-layer-free edge region 7 of the laminated pane 1, wherein it extends mainly along the short pane edge 15a', for example, under a motor vehicle molding (not shown) in the region of a masking strip (not shown). The connecting conductor 12 is positioned at an adequate distance both from the pane edge 15a' and from the edge of the heating layer 6, by which means a capacitive coupling with the heating layer 6 and the motor vehicle body is thwarted.

Since the connecting conductor 12 is situated outside an area that is defined in that every point contained therein can be projected by orthogonal parallel projection onto the heating layer 6 serving as a planar antenna and representing a projection area (or onto the portion of the heating layer 6 active as a planar antenna), the linear antenna is not electrically loaded by the planar antenna.

The first antenna connection 8 is electrically coupled galvanically to the connecting conductor 12 at one end thereof. Moreover, the other end of the linear connecting conductor 12 is electrically coupled galvanically to the second antenna connection 9. The galvanic connection is made, for example, by common printing of the antenna connections 8,9 and of the connecting conductor 12 in a continuous structure. By means of the galvanic connection, transmission losses are reduced.

The connection point between the second antenna connection 9 and the connecting conductor 12 can be regarded as the antenna foot point 13 for picking up antenna signals of the planar antenna. If the connecting conductor 12 is implemented, as in this example, as a linear antenna, the antenna foot point 13 serves as a common connection point for the antenna signals of the planar antenna around the first antenna connection 8, for the antenna signals of the linear antenna, which is formed by the connecting conductor 12, as well as for the antenna signals of the planar antenna around the second antenna connection 9. The antenna signals of the planar and linear antennas are thus made available at the second antenna connection 9 or at the antenna foot point 13 located there.

The antenna foot point 13 is electrically coupled to a connection conductor acting parasitically as an antenna. In the present exemplary embodiment, the connection conductor is galvanically coupled to the antenna foot point 13. Via the connection conductor and a connector connected thereto, the antenna signals of the antenna pane 100 are electrically connected to downstream electronic components, for example, to an antenna amplifier 14, with the antenna signals guided out of the laminated pane 1 through the connection conductor.

The spatial position of the antenna foot point 13 is selected such that the connection conductor is as short as possible and its parasitic action as an antenna is minimized such that, for example, it is possible to forgo the use of a specifically designed high-frequency conductor. The connection conductor is preferably shorter than 100 mm. Accordingly, in this case, the connection conductor is implemented, for example, as an unshielded stranded wire or foil conductor, which is economical and space-saving and, moreover, can be connected by a relatively simple connection technique. The width of the connection conductor implemented here, for example, as a flat conductor preferably tapers toward the pane edge 15a', to thwart capacitive coupling with the motor vehicle body.

The antenna pane according to the invention 100 brings together, at one connection point, the antenna signals of multiple planar antenna regions and, optionally, one or more linear antennas without the heating function of the pane being appreciably impaired. This was unexpected and surprising for the person skilled in the art.

It is understood that the laminated pane 1 according to the invention can have other features of a technically conventional pane, for example, an opaque black or masking print concealing the edge region or another heating-layer-free region in the heating layer 6, which can, for example, serve as a communication window.

It is likewise understood that, in the context of the present invention, the heating layer 6, the busbars 5a,5b, the antenna connections 8,9, and/or connecting conductor 12, can be arranged individually or all, on an areal carrier, which is bonded directly or by one or a plurality of adhesive layers or is embedded between two individual panes 2,3. Such an areal carrier is preferably produced from plastic, preferably based on polyimide (PA), polyurethane (PU), polyvinyl chloride (PVC), polycarbonate (PC), polyester (PE), and polyvinyl butyral (PVB), particularly preferably based on polyester (PE) and polyethylene terephthalate (PET).

FIG. 2 depicts a schematic top view of an alternative exemplary embodiment of an antenna pane according to the invention 100. To avoid unnecessary repetition, only the differences relative to the exemplary embodiment of FIG. 1A and FIG. 1B are explained; and, for the rest, reference is made to the statements made there. Accordingly, the antenna pane 100 is designed as a laminated pane 1 and has, as described above, a heating layer 6 and busbars 5a, 5b. Furthermore, the laminated pane 1 has a second antenna connection 9, which is, as already described, electrically contacted to a section 11 of the heating field 6 electrically divided by a separation region 10.

The exemplary embodiment in FIG. 2 differs from the laminated pane 1 of FIG. 1A in that the first antenna connection 8 is not arranged in the center of the pane edge 15a', but rather in the upper region of the pane edge 15a' on the boundary with the upper pane edge 15b. The first antenna connection 8 is identical to the end of the second busbar 5b and is thus in galvanic contact therewith.

The first antenna conductor 8 is in turn galvanically connected to the second antenna conductor 9 by a connecting conductor 12. The connecting conductor 12 is implemented as a linear antenna conductor. In the exemplary embodiment depicted, the length of the connecting conductor 12 serving as an antenna conductor is roughly 650 mm with a width of 0.75 mm.

Figure 2:
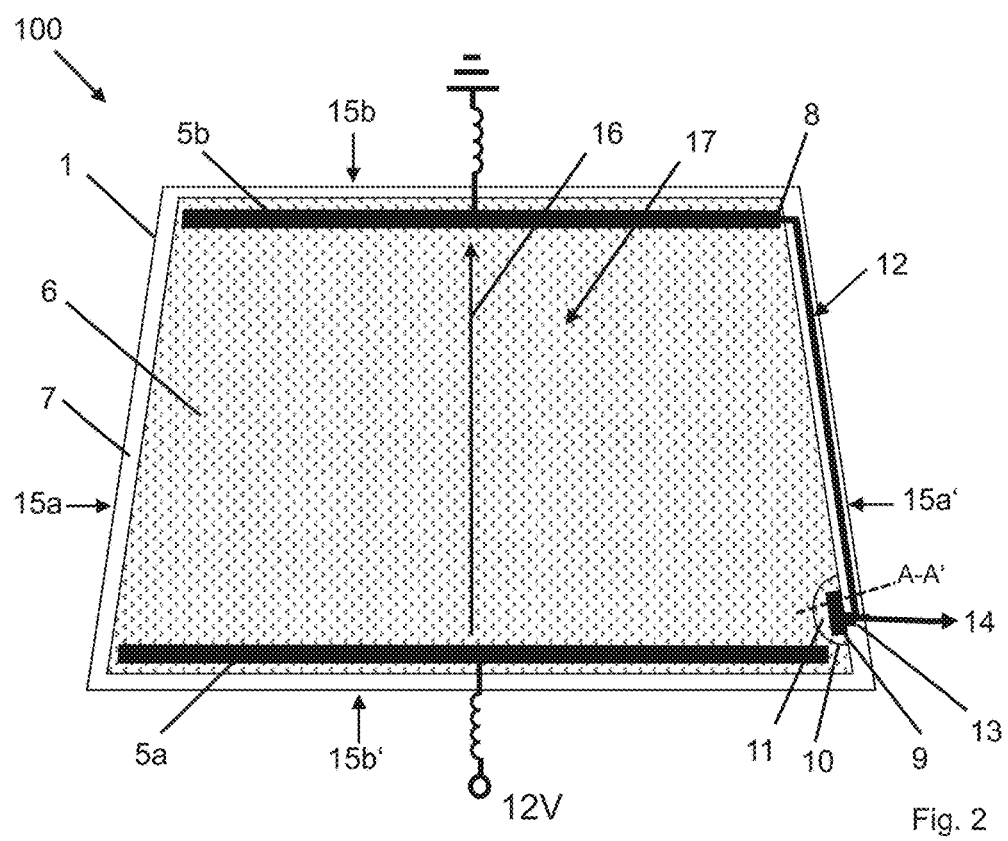

To avoid unnecessary repetition, only the differences relative to the exemplary embodiment of FIG. 1A and FIG. 1B are explained; and, for the rest, reference is made to the statements made there. Accordingly, the antenna pane 100 is designed as a laminated pane 1 and has, as described above, a heating layer 6 and busbars 5a,5b. Furthermore, the laminated pane 1 has a second antenna connection 9, which is, as already described, electrically contacted to a section 11 of the heating field 6 electrically divided by a separation region 10, Furthermore, the outer pane 2 is provided with an opaque color layer that is applied on the second pane surface II and forms a frame-like circumferential masking strip 20. The color layer is preferably made of an electrically nonconducting, black colored material that can be fired into the outer pane 2. On the one hand, the masking strip 20 prevents viewing an adhesive strand (not shown), with which the laminated pane 1 can be glued into a motor vehicle body; on the other, it serves as UV protection for the adhesive material used. Of course, the opaque color layer can also be implemented on other sides of the overall structure.

In the exemplary embodiment depicted, the heating layer 6 has, in the upper central region of the pane 1, a, for example, circular heating-layer-free region, which serves, for example, as a communication window 22 or a sensor window, for example, for a rain sensor. By means of the communication window 22, electromagnetic radiation and, in particular, infrared radiation can pass virtually unhindered through the laminated pane 1 and strike a sensor arranged behind the laminated pane 1 or be emitted therefrom. Here, the busbar 5b is guided in the shape of a rectangle around the communication window 22. The busbar 5b is implemented thinner in the bypass than on the upper pane edge 15b, in order to be visually less conspicuous. To nevertheless ensure a consistently low-ohmic connection to the ground potential, the second busbar 5b is, in this example, connected to the ground potential via two connections. It is understood that the first busbar 5a as well or only the first busbar 5a can have two or more connections for supplying voltage.

Figure 3A:
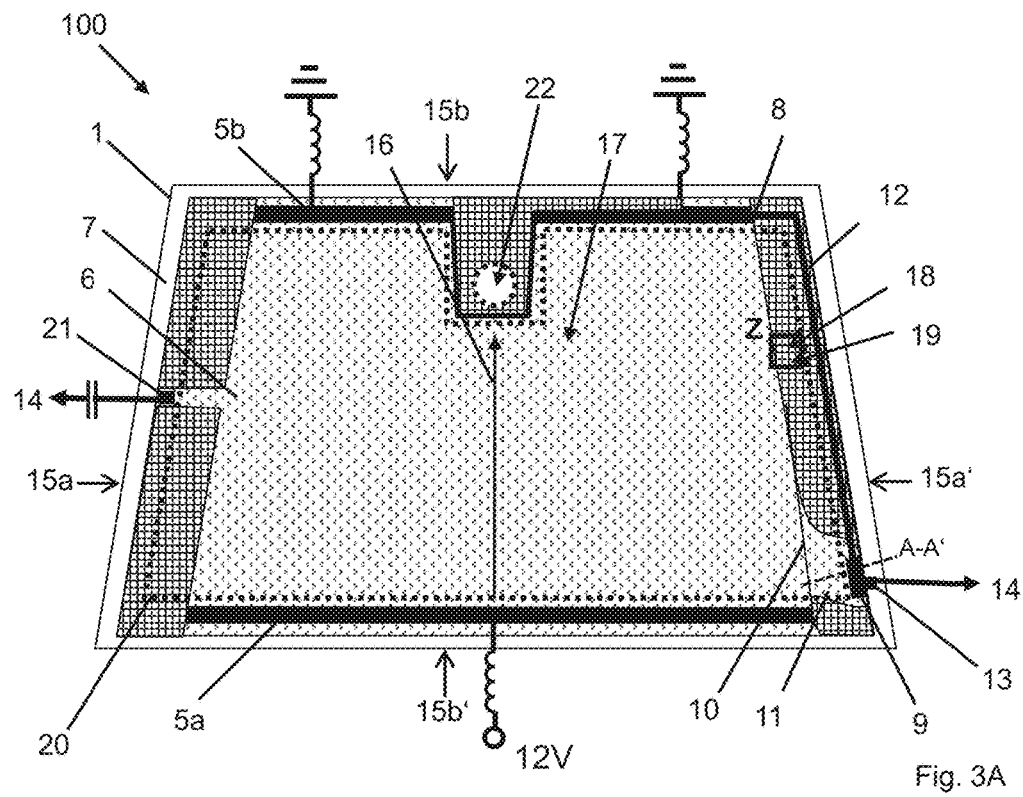
FIG. 3A depicts a schematic top view of an alternative exemplary embodiment of an antenna pane 100 according to the invention.
Figure 3B:
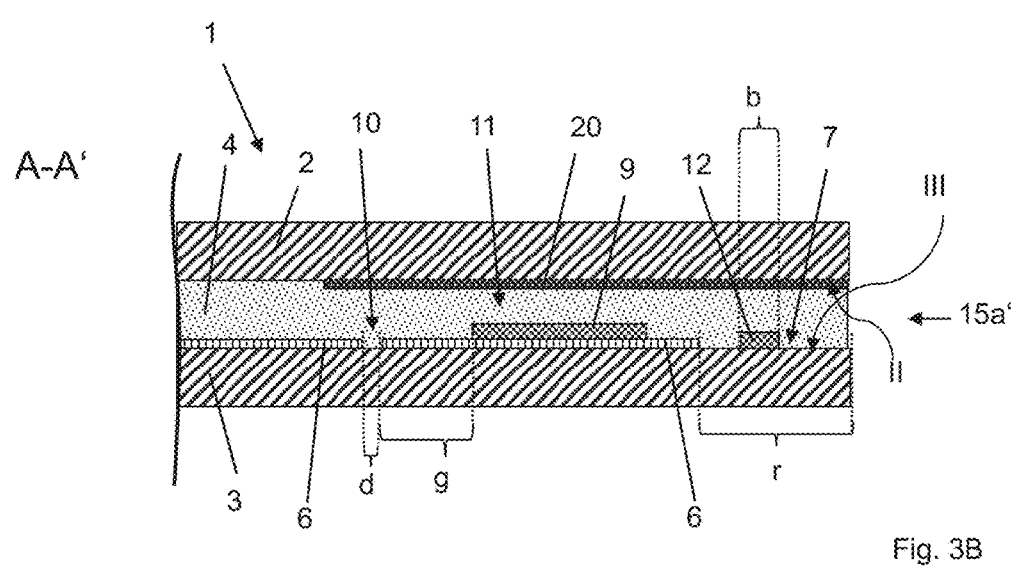
FIG. 3B depicts a schematic cross-sectional view along section line A-A' of the exemplary embodiment of the antenna pane 100 according to the invention of FIG. 3A.
Figure 3C:
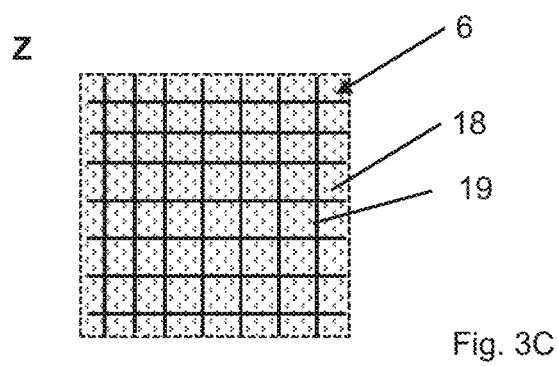
FIG. 3C depicts an enlarged view of the detail Z of the exemplary embodiment of the antenna pane 100 according to the invention of FIG. 3A.

As depicted in FIG. 3A and 3C, the heating layer 6 is divided into multiple regions and in particular, adjacent the heating-layer-free edge regions 7 along the pane edges 15a,15a' into a plurality of electrically isolated segments 18, between which, in each case, electrically isolating (decoated) separation lines 19 are situated.

As is disclosed in WO 2010/081589 A1 already mentioned in the introduction, capacitive coupling of the heating layer 6 with surrounding conductive structures, for example, an electrically conductive motor vehicle body, can be advantageously counteracted by this measure.

The separation lines 19 have, for example, only a small width of roughly 100 µm and are, for example, produced using laser ablation. The division of the heating layer 6 into a plurality of segments 18 electrically isolated from one another is, consequently, hardly discernible to the eye and impairs vision through the laminated pane 1 only slightly. At the same time, this segmentation prevents capacitive coupling of the heating layer 62 surrounding conductive structures, for example, the electrically conductive motor vehicle body. Consequently, it is particularly advantageous to arrange a linear antenna in this region since this can be placed at a greater distance from the motor vehicle body and, as a result, the linear antenna also has a much lower capacitive coupling with the motor vehicle body.

In this exemplary embodiment, the connecting conductor 12 implemented as a linear antenna conductor has an at least approximately straight line course and is situated virtually completely on a region of the heating layer 6 that is divided into a plurality of segments 18 electrically isolated from one another. As a result of the division into segments 18, the heating layer 6 does not negatively affect the function of the linear antenna in this region. In particular, by means of the segmentation, it is advantageously achieved that, from a high-frequency technology standpoint, the effective distance between the heating layer 6 and the linear antenna on the one hand and the motor vehicle body on the other is increased.

In the exemplary embodiment depicted, two regions with electrically isolated segments 18 are arranged in each case in strip form parallel to the shorter pane edges 15a,15a' and thus roughly parallel to the heating current 16 in the heating field 17, which is adjacent the region with segments. As a result of this arrangement, the course of the current paths in the heating field 17 is not disturbed and the heating power distribution and temperature distribution during heating is very homogeneous. In order to ensure an undisturbed course of the heating current 16 in the heating field 17, the section 11 is arranged in a recess of the segmented region. The separation line 10 continues the boundary, running roughly parallel to the pane edge 15a', of the segmented region. As a result of this measure, the course of the heating current 16 in the heating field 17 is not disturbed.

In another recess of the segmented region on the opposing shorter pane edge 15a, a further antenna connection 21 is arranged. This further antenna connection 21 is, however, for example, not insulated from the heating layer 6 by a separation line 10. The antenna signal of the heating layer 6 serving as a planar antenna in the vicinity picked up at the further antenna connection 21 is, upon application of a supply voltage on the busbars 5a,5b, at the local potential of the heating field 17. With a roughly central arrangement of the further antenna connections 21, these are, for example, roughly 6 V. This means that the antenna signal of the further antenna connections 21 must only be connected to the antenna amplifier 14 via a capacitive coupling and not via a galvanic coupling. In this example, a galvanic coupling would result in a short-circuit between the further antenna connection 21 and the first antenna connection 8, which is, for its part, connected to the busbar 5b. Since there is a mass potential on the busbar 5b, the short-circuit would result in the fact that, on the further antenna connection 21, there would also be a mass potential on the heating layer 6 and the heating field 17 would become very inhomogeneous.

It is understood that the pane 1 according to the invention can have even further antenna connections 21', 21" that are arranged, for example, in the region around the communication window 22. Depending on the position and, thus, depending on the potential, these can be connected directly (i.e., via a galvanic coupling) or via a coupling capacitor (i.e., by capacitive coupling) to the antenna amplifier 14.

Figure 4:
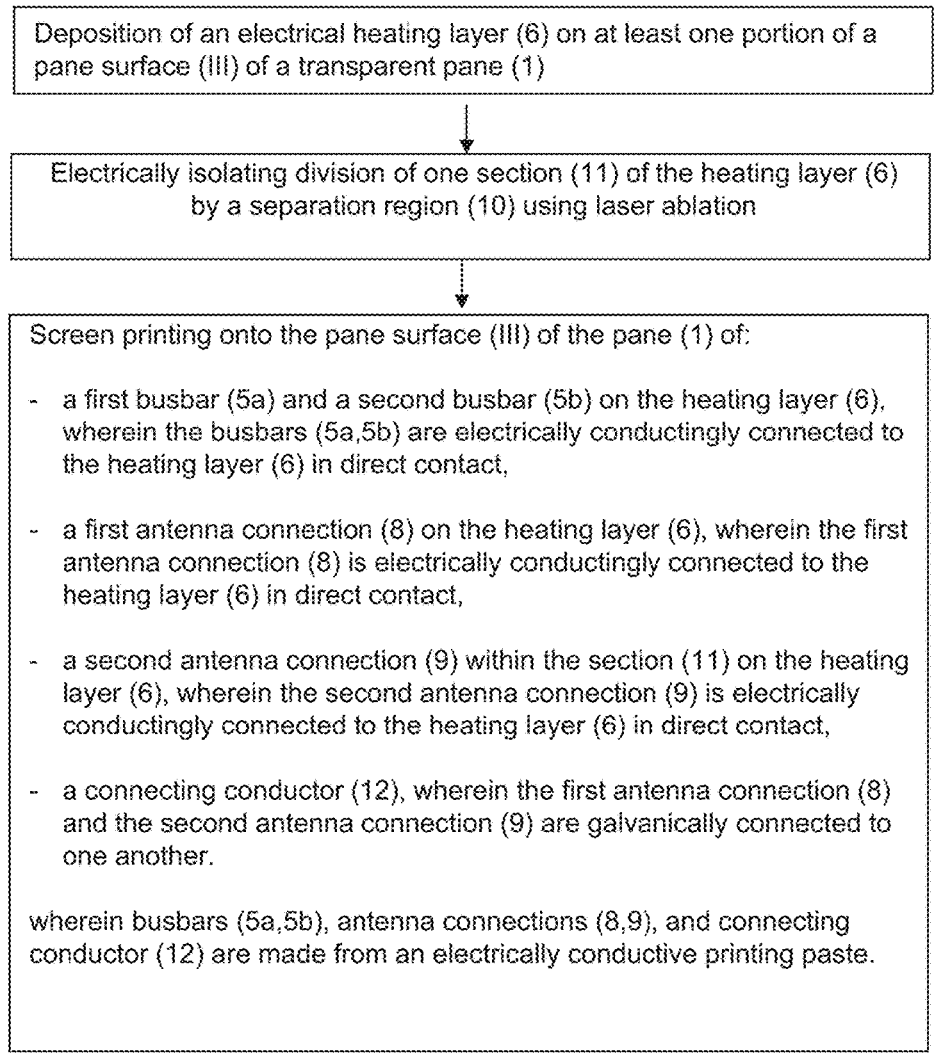

FIG. 4 depicts a flowchart of an exemplary embodiment of the method according to the invention.

In the following, some further exemplary aspects of the manufacturing method according to the invention are described for an antenna pane 100 as a laminated pane 1:

First, outer pane 2 and inner pane 3 are cut in the desired trapezoidal shape from a glass blank. Then, the inner pane 3 is coated with the heating layer 6 by sputtering, using a mask so the edge strip 7 remains uncoated. Alternatively, it would also be possible to first coat a glass blank from which the inner pane 3 is then cut. The inner pane 3 pretreated in this manner is de-coated to form the edge strip 7, which can be done in industrial series production, for example, by means of a mechanically ablating grinding wheel or by laser ablation.

Thereafter, or simultaneously, one section 10 is divided from the heating layer 6 electrically isolatingly for direct current by a separation line 11. Additionally, separation zones 19 can be de-coated, forming a plurality of electrically isolated segments 18. The separation line 11 and the separation regions 19 are preferably de-coated by laser ablation. This has the particular advantage that reliable electrical isolation can be obtained and, at the same time, the separation line 11 and the separation regions 19 are very fine and are visually quite inconspicuous.

Then, the two busbars 5a, 5b, the first antenna connection 8, the second antenna connection 9, and the connecting conductor 12 are printed on the inner pane 3 by screenprinting. A silver printing paste can, for example, be used as the printing paste. Then, the printing paste is pre-fired, followed by bending of the panes 2, 3 at a high temperature. An electrical connection of the busbars 5a, 5b to the first and connection conductors can, for example, be done by soldering or fixing by means of a conductive adhesive or, for example, by ultrasonic soldering. The same is true for the connection conductors that serve to forward the antenna signals from the antenna foot point 13 to the antenna amplifier 14. Then, the positioning together of the outer and inner pane 2, 3 and bonding by means of the adhesive layer 4 are done.

The invention makes available an antenna pane 100, in which the antenna signal is improved by several antenna connections 8,9 without the antenna connections 8,9 negatively affecting the heating function of the antenna pane 100. In an advantageous embodiment of the invention, by means of a corresponding configuration of the connecting conductors 12 between the antenna connections 8,9 as a linear antenna, bandwidth optimized reception of electromagnetic waves is enabled, wherein by means of the planar antenna and linear antenna combination, satisfactory reception performance can be achieved over the complete frequency range of the bands I-V.

This was unexpected and surprising for the person skilled in the art.

LIST OF REFERENCE CHARACTERS 1 pane, laminated pane
2 outer pane
3 inner pane
4 adhesive layer
5a first busbar
5b second busbar
6 heating layer
7 edge region
8 first antenna connection
9 second antenna connection
10 separation region
11 section
12 connecting conductor
13 antenna foot point
14 antenna amplifier
15a, 15a' long pane edge
15b, 15b' short pane edge
16 heating current
17 heating field
18 segment
19 separation line
20 masking strip
21,21',21" further antenna connections
22 communication window
100 antenna pane
b width of the connecting conductor 12
A-A' section line
d width of the separation region 10, width of the separation line 19
g distance of the separation region 10 from the second antenna connection 9
r width of the edge region 7
Z detail
II pane surface of the outer pane 2
III pane surface of the inner pane 3

The invention claimed is:

1. An electrically heatable antenna pane, comprising
a transparent pane;
a heating layer extending over a portion of a pane surface of the transparent pane and serving as a planar antenna for receiving and/or transmitting electromagnetic waves;

a first busbar and a second busbar connectable to a voltage source, wherein the first busbar and the second busbar are connected with the heating layer;

a first antenna connection that is electrically conductingly connected with the heating layer;

a second antenna connection electrically conductingly connected with a section of the heating layer in direct contact; and the second antenna connection being galvanically and physically isolated from a portion of the heating layer outside and adjacent to the section, wherein in an operative condition and upon applying a supply voltage by the voltage source, a heating current flows over a heating field formed by the heating layer, wherein the section of the heating layer is electrically insulated from the rest of the heating layer by a heating-layer-free separation region, and wherein the section of the heating layer is capacitively coupled with an adjacent heating layer for a transmission of antenna signals.

2. The antenna pane according to claim 1, wherein a connecting conductor connects the first antenna connection with the second antenna connection and has a common antenna foot point.

3. The antenna pane according to claim 2, wherein the connecting conductor is arranged on the pane.

4. The antenna pane according to claim 3, wherein the connecting conductor is arranged on the heating layer-free edge region of the pane surface.

5. The antenna pane according to claim 2, wherein the connecting conductor is implemented at least section-wise as an unshielded, linear antenna conductor and serves as a linear antenna for receiving electromagnetic waves.

6. The antenna pane according to claim 1, wherein the first antenna connection or the second antenna connection is connected with the first busbar or with the second busbar.

7. The antenna pane according to claim 6 further comprising a filter configured to decouple the first busbar or the second busbar from the voltage source.

8. The antenna pane according to claim 1, wherein the first antenna connection, the second antenna connection, and/or the at least one connecting conductor is made of a metal wire or a metal foil.

9. The antenna pane according claim 1, wherein the first antenna connection, the second antenna connection, and/or the at least one connecting conductor are made from an electrically conductive printing paste.

10. The antenna pane according to claim 1, wherein the heating-layer-free separation region has a distance up to 200 mm from the second antenna connection.

11. The antenna pane according to claim 1, wherein the section of the heating layer has an area equal to or less than 10% of the surface of the heating layer.

12. The antenna pane according to claim 1, wherein the heating layer has a plurality of planar segments that are electrically divided by an electrically isolating separation.

13. The antenna pane according to claim 12, wherein the plurality of segments are adjacent the heating layer free edge region.

14. The antenna pane according to claim 12, wherein each of the plurality of planar segments has an area of $0.1$ mm$^2$ to $100.0$ mm$^2$.

15. The antenna pane according to claim 12, wherein the connecting conductor is arranged at least section-wise on the planar segments.

16. The antenna pane according to claim 1, wherein the separation region has a width d of 25 μm to 300 μm.

17. The antenna pane according to claim 1, implemented as a laminated pane with two individual panes bonded to one another by a thermoplastic adhesive layer wherein the heating layer is placed on at least one surface of the individual panes and/or on one surface of a carrier arranged between the individual panes.

18. An arrangement comprising the electrically heatable antenna pane of claim 1, the arrangement being selected from a group consisting of: a functional and/or decorative individual piece, a piece of furniture, a device, a building, a windshield, a rear window, a side window and a glass roof.

19. An arrangement comprising the electrically heatable antenna pane of claim 1, the arrangement being selected from a group consisting of: a functional and/or decorative individual piece or built in component in furniture, devices or buildings.

20. An arrangement comprising the electrically heatable antenna pane of claim 1, the arrangement being selected from a group of vehicles consisting of: vehicles from traveling on land, in the air or on water.

21. An arrangement comprising the electrically heatable antenna pane of claim 1, the arrangement being selected from a group consisting of: motor vehicles windshield, rear window, side window and/or glass roof.

22. A method for producing an electrically heatable antenna pane, comprising:

a) depositing one electrical heating layer on a portion of a pane surface of a transparent pane;

b) insulating a section of the electrical heating layer from direct currents by a heating-layer-free separation region;

c) connecting a first busbar and a second busbar with the heating layer;

d) connecting electrically conductingly a first antenna connection with the heating layer in direct contact;

e) connecting electrically conductingly a second antenna connection with the electrical heating layer within the section and in direct contact, thereby isolating galvanically and physically the second antenna connection from a portion of the electrical heating layer outside and adjacent to the section, and thereby coupling capacitively the second antenna connection with the portion of the electrical heating layer outside and adjacent to the section for transmission of antenna signals;

f) placing a connecting conductor on the pane;

g) connecting the first antenna with the second antenna; and h) applying a supply voltage to the busbars, thereby flowing a heating current over a heating field formed by the heating layer.

23. The method for producing an antenna pane according to claim 22, wherein the steps c), d), e), and f) are performed by screenprinting an electrically conductive printing paste on the at least one portion of the pane surface of the transparent pane.

24. The method for producing an antenna pane according to claim 22, the step b) is performed by laser ablation.

25. The method for producing an antenna pane according to claim 22, wherein the steps c), d), e) and f) are performed simultaneously.

* * * * *